United States Patent
Shih et al.

(10) Patent No.: US 10,611,142 B2
(45) Date of Patent: Apr. 7, 2020

(54) INKJET WIDTH ADJUSTMENT METHOD AND THREE-DIMENSIONAL PRINTING EQUIPMENT

(71) Applicants: XYZprinting, Inc., New Taipei (TW); Kinpo Electronics, Inc., New Taipei (TW)

(72) Inventors: Ko-Wei Shih, New Taipei (TW); Hsin-Ta Hsieh, New Taipei (TW); Yu-Ting Huang, New Taipei (TW); Kuo-Yen Yuan, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 0 days.

(21) Appl. No.: 16/159,727

(22) Filed: Oct. 15, 2018

(65) Prior Publication Data
US 2020/0009862 A1    Jan. 9, 2020

(30) Foreign Application Priority Data
Jul. 9, 2018 (CN) .......................... 2018 1 0743541

(51) Int. Cl.
B41J 2/045 (2006.01)
B41M 5/00 (2006.01)
(Continued)

(52) U.S. Cl.
CPC ....... *B41J 2/04508* (2013.01); *B41J 2/04586* (2013.01); *B41M 5/0047* (2013.01);
(Continued)

(58) Field of Classification Search
CPC ... B41J 2/04508; B41J 2/04586; B33Y 10/00; B33Y 30/00; G06T 17/20; B41M 5/0047
See application file for complete search history.

(56) References Cited

U.S. PATENT DOCUMENTS 5,345,391 A     9/1994 Hull et al.
2002/0167101 A1*  11/2002 Tochimoto .............. B29C 41/36
                                                          264/40.1
(Continued)

FOREIGN PATENT DOCUMENTS

WO     2016003277     1/2016

OTHER PUBLICATIONS

"Office Action of Taiwan Counterpart Application", dated Nov. 7, 2018, p. 1-p. 6.
(Continued)

*Primary Examiner* — Bradley W Thies
(74) *Attorney, Agent, or Firm* — JCIPRNET

(57) ABSTRACT

An inkjet width adjustment method adapting to three-dimensional printing equipment is provided. The method in one of exemplary embodiments is provided hereafter. A three-dimensional digital model is obtained, and a slicing procedure is performed on the three-dimensional digital model to produce a layer object, wherein the layer object has a cross-sectional contour. A surface tilt degree corresponding to the cross-sectional contour is obtained from the three-dimensional digital model, and an ideal inkjet width of the layer object is calculated according to the surface tilt degree corresponding to the cross-sectional contour. After a print module is controlled to print the layer object, an inkjet module is controlled to spray ink along the cross-sectional contour of the layer object according to the ideal inkjet width. In addition, the three-dimensional printing equipment is also provided.

10 Claims, 8 Drawing Sheets

(51) Int. Cl.
*B33Y 30/00* (2015.01)
*G06T 17/20* (2006.01)
*B33Y 10/00* (2015.01)

(52) U.S. Cl.
CPC .............. *B33Y 10/00* (2014.12); *B33Y 30/00* (2014.12); *G06T 17/20* (2013.01)

(56) References Cited

U.S. PATENT DOCUMENTS

2018/0162056 A1 6/2018 Kaneko et al.
2018/0186090 A1 7/2018 Shih et al.

OTHER PUBLICATIONS

"Search Report of Europe Counterpart Application", dated Jul. 4, 2019, p. 1-p. 9.

\* cited by examiner

INKJET WIDTH ADJUSTMENT METHOD AND THREE-DIMENSIONAL PRINTING EQUIPMENT

CROSS REFERENCE TO RELATED APPLICATION

This application claims the priority benefit of China application serial no. 201810743541.1, filed on Jul. 9, 2018. The entirety of the above-mentioned patent application is hereby incorporated by reference herein and made a part of specification.

BACKGROUND

1. Technique Field

The disclosure relates to an inkjet technique of three-dimensional printing, and more particularly to an inkjet width adjustment method and three-dimensional printing equipment.

2. Description of Related Art

With advancements in computer-aided manufacturing (CAM), the manufacturing industry has developed a three-dimensional printing technology that may be used to put an original design concept into practice quickly. In fact, the three-dimensional printing technology is a collective term for a series of rapid prototyping technologies. The basic principle is that additive manufacturing is conducted on a printing platform, and a rapid prototyping machine scans an object in a horizontal plane to print a plurality of layer objects sequentially on the printing platform to create a three-dimensional object by stacking up the layer objects. In the case of the fused deposition modeling (FDM) technology, forming materials are used to produce a wire, and the forming materials are fused in the heat to be stacked layer by layer on a forming platform according to the desired shape/contour to form a three-dimensional object.

To meet the demand for color three-dimensional printing, the current three-dimensional printing technology further includes spraying ink onto the three-dimensional object that is being printed. In other words, a three-dimensional printing device prints the layer objects, and while simultaneously spraying ink onto each layer of the layer objects to produce a color three-dimensional object. In a color three-dimensional printing technology, the three-dimensional printing device sprays ink onto contour edges of each of the layer objects according to the same predetermined inkjet width, so a surface of the three-dimensional object formed by layer objects being stacked up displays colors. However, a range of an inkjet area on the layer objects influences the adhesion and color effects of the layer objects.

For example, when a distance between cross-sectional edges of the two vertically adjacent layer objects is greater than the predetermined inkjet width, the surface of the three-dimensional object will display a section that is not colored. Thus, the printing quality of color three-dimensional printing is influenced. FIG. 1 illustrates an embodiment of spraying ink onto the layer object according to the predetermined inkjet width. As shown in FIG. 1, when a distance D1 between a cross-sectional edge of a layer object L1 above and a cross-sectional of a layer object L2 below is greater than a predetermined inkjet width Wd1, a portion of the layer object L2 that is exposed on the surface of the three-dimensional object includes an uncolored section B1. Especially, when the surface of the three-dimensional object is tilted smoothly, the situation as shown in FIG. 1 is more obvious. Thus, how to devise a more desirable way of color three-dimensional printing becomes one of the issues that relevant artisans should contemplate.

SUMMARY OF THE INVENTION

The disclosure provides an inkjet width adjustment method and three-dimensional printing equipment, which is able to determine an ideal inkjet width based on a surface tilt degree corresponding to a layer object to allow the three-dimensional printing equipment to spray ink onto the three-dimensional object accurately for coloring purposes.

An embodiment of the disclosure provides an inkjet width adjustment method adapted to produce a color three-dimensional object. The inkjet width adjustment method in one of the exemplary embodiments includes the following steps. A three-dimensional digital model is obtained, and a slicing procedure is performed on the three-dimensional digital model to produce a layer object, wherein the layer object has a cross-sectional contour. A surface tilt degree corresponding to the cross-sectional contour is obtained from the three-dimensional digital model, and an ideal inkjet width of the layer object is calculated according to the surface tilt degree corresponding to the cross-sectional contour. After a print module is controlled to print the layer object, an inkjet module is controlled to spray ink along the cross-sectional contour of the layer object according to the idea inkjet width.

In an embodiment of the disclosure, the step of obtaining the surface tilt degree corresponding to the cross-sectional contour from the three-dimensional digital model and calculating the ideal inkjet width according to the surface tilt degree corresponding to the cross-sectional contour includes the following steps. At least one polygon mesh corresponding to the cross-sectional contour is obtained from the three-dimensional digital model. At least an included angle between the at least one polygon mesh and a horizontal plane for representing the surface tilt degree is calculated. The ideal inkjet width of the layer object is calculated according to the at least one included angle, a layer thickness and a predetermined inkjet width.

In an embodiment of the disclosure, the step of calculating the ideal inkjet width according to the at least one included angle, the layer thickness and the predetermined inkjet width includes the following steps. A product of a cotangent value of the at least one included angle and the layer thickness is calculated. A maximum value among the product and the predetermined inkjet width is taken as the ideal inkjet width of the layer object.

In an embodiment of the disclosure, the at least one polygon mesh includes a first polygon mesh and a second polygon mesh. The step of calculating the at least one included angle between the at least one polygon mesh and the horizontal plane includes the following steps. A first included angle between the first polygon mesh and the horizontal plane is calculated, and a second included angle between the second polygon mesh and the horizontal plane is calculated.

In an embodiment of the disclosure, the step of calculating the ideal inkjet width according to the at least one included angle, the layer thickness and the predetermined inkjet width includes the following steps. A first ideal inkjet width of the ideal inkjet width is calculated according to the first included angle, the layer thickness and the predetermined inkjet width, and a second ideal inkjet width of the ideal inkjet width is calculated according to the second included angle, the layer thickness and the predetermined inkjet width.

In an embodiment of the disclosure, the method further includes the following step. An inkjet image is produced according to the ideal inkjet width and the cross-sectional contour, and the inkjet image includes an inkjet area formed based on the ideal inkjet width.

In another aspect, an embodiment of the disclosure provides three-dimensional printing equipment adapted for producing a color three-dimensional object. The three-dimensional printing equipment includes a print module, an inkjet module, a storage device and a processing device. The print module includes a print head, and the inkjet module includes an inkjet head. The storage device records a plurality of modules, and the processing device is coupled to the storage device and is configured to execute the modules to implement the steps provided hereafter. A three-dimensional digital model is obtained, and a slicing procedure is performed on the three-dimensional digital model to produce a layer object, wherein the layer object has a cross-sectional contour. A surface tilt degree corresponding to the cross-sectional contour is obtained from the three-dimensional digital model, and an ideal inkjet width of the layer object is calculated according to the surface tilt degree corresponding to the cross-sectional contour. After a print module is controlled to print the layer object, an inkjet module is controlled to spray ink along the cross-sectional contour of the layer object according to the ideal inkjet width.

In view of the above, for the inkjet width adjustment method and the three-dimensional printing equipment according to the embodiments of the disclosure, the ideal inkjet width may be adjusted appropriately according to the surface tilt degree corresponding to the layer object on the three-dimensional object. After the print head prints the layer object, the three-dimensional printing equipment may control the inkjet module to spray ink along the cross-sectional contour of the layer object according to the ideal inkjet width. In this way, even if the surface tilt degree of the three-dimensional object is rather smooth or even if a gap between edges of the two vertically adjacent layer objects is overly large, the outer surface of the three-dimensional object may all be colored accurately, and the printing quality of the color three-dimensional printing improves significantly.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
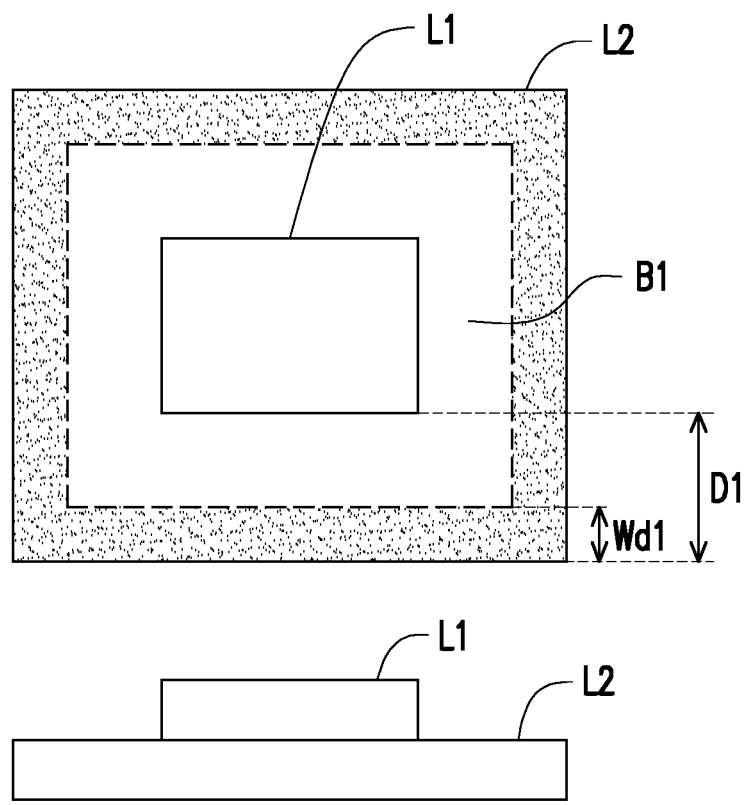
FIG. 1 illustrates an embodiment of spraying ink onto a layer object according to a predetermined inkjet width.

Reference will now be made in detail to the present preferred embodiments of the invention, examples of which are illustrated in the accompanying drawings. Wherever possible, the same reference numbers are used in the drawings and the description to refer to the same or like parts.

Figure 2:
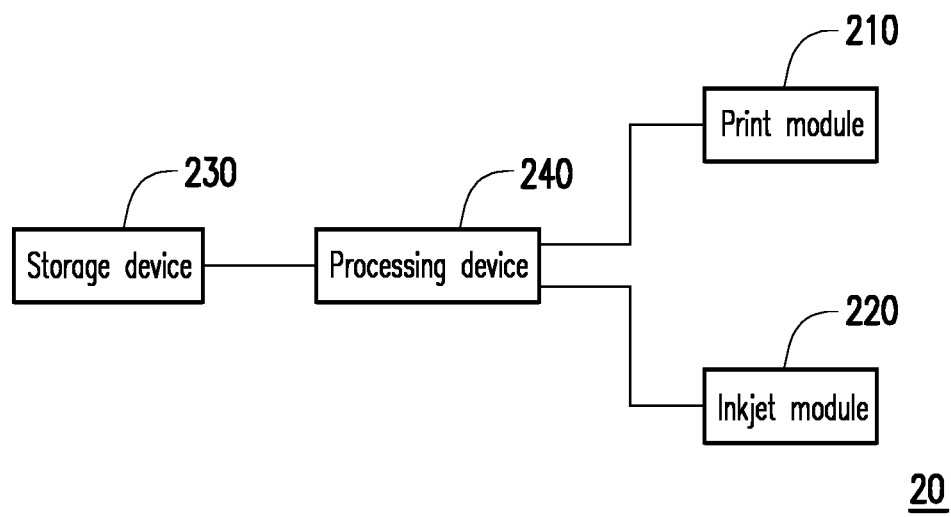
FIG. 2 is a block diagram of three-dimensional printing equipment according to an embodiment of the disclosure.

FIG. 2 is a schematic view of three-dimensional printing equipment according to an embodiment of the disclosure. Referring to FIG. 2, three-dimensional printing equipment 20 includes a print module 210, an inkjet module 220, a storage device 230 and a processing module 240. The processing module 240 is coupled to the print module 210, the inkjet module 220 and the storage device 230. In the embodiment, the processing device 240 is configured to control the print module 210 and the inkjet module 220 to perform three-dimensional printing.

In the embodiment, the storage device 230 may be configured to store data and may be a buffer memory, an internal storage medium, an external storage medium, other types of storage devices, or a combination thereof. The buffer memory may include, for example, a random access memory, a read-only memory, or other similar devices. The internal storage medium may include, for example, a hard disk drive (HDD), a solid state disk, a flash storage device, or other similar devices. The external storage medium may include, for example, an external drive, a USB drive, a cloud drive, or other similar devices. In one embodiment, the storage device 230 may further be configured to store a plurality of modules, and these modules may be software programs for the processing device 240 to read or execute these modules to carry out the inkjet width adjustment method according to the embodiments of the disclosure.

In the embodiment, the processing device 240 may include a processing chip, an image processing chip, or may be, for example, a central processing unit (CPU), or other programmable microprocessors with general or particular purposes, a digital signal processor (DSP), a programmable controller, application specific integrated circuits (ASIC), a programmable logic device (PLD), other similar processing circuits, or a combination thereof.

In the embodiment, the processing device 240 may perform three-dimensional printing operation and inkjet printing operation through the print module 210 and the inkjet module 220. For example, three-dimensional printing operation may include, feeding forming materials on a forming platform, and the inkjet module 220 may spray ink onto the cured or curing forming materials on the forming platform. Additionally, persons of ordinary skill in the art should be aware that the three-dimensional printing equipment 20 may further include other components (e.g., a platform, a feeding pipe, an inkjet pipe, a print head linkage mechanism, a drive motor, etc.) configured to work together with the print module 210 and the inkjet module 220 to perform three-dimensional printing and inkjet printing.

Note that in one embodiment of the disclosure, the three-dimensional printing equipment 20 may include a host computer and a three-dimensional printer with the print module 210 and the inkjet module 220, and the processing device 240 may include a processor of the host computer and a processor and/or a controller of the three-dimensional printer. For example, the three-dimensional printing equipment 20 may be implemented by a laptop computer or a desktop computer, and the three-dimensional printer, but the disclosure does not intend to impose a limitation on this regard. In another embodiment, the three-dimensional printing equipment 20 may also be a three-dimensional printer capable of processing a three-dimensional digital model, but the disclosure does not intend to impose a limitation on this regard.

Figure 3:
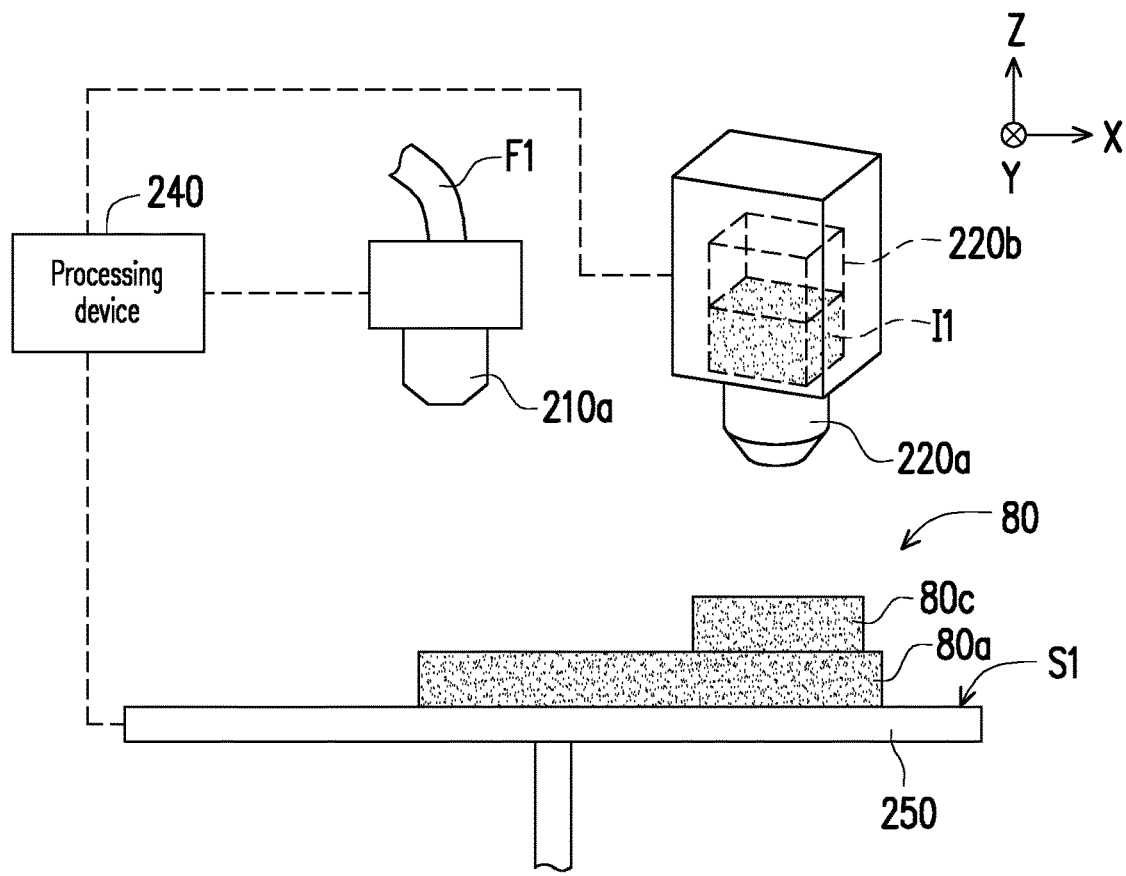
FIG. 3 is a schematic view of the three-dimensional printing equipment of FIG. 2.

FIG. 3 is a schematic view of the three-dimensional printing equipment according to the embodiment of FIG. 2. Referring to FIG. 3, the print module 210 may include a print head 210a, and the inkjet module 220 may include an inkjet head 220a. Meanwhile, a Cartesian coordinate system is provided for descriptions of relevant components and movement thereof. A forming platform 250 includes a bearing surface S1 for bearing a color three-dimensional object 80 that is being printed. The forming platform 250 is disposed below the print head 210a and the inkjet head 220a.

In detail, in the embodiment, the processing device 240 may obtain a three-dimensional digital model that is compliant with the three-dimensional file format such as polygon file format (PLY), STL, or OBJ, etc. The three-dimensional digital model in the above three-dimensional file formats is composed of a plurality of polygon meshes, and each of the polygon meshes has a plurality of vertices having the different coordinates respectively. In the embodiment, the processing device 240 may be configured to perform a slicing procedure on the three-dimensional digital model to produce a plurality of layer objects to obtain the layer information about each of the layer objects. The above layer information includes a cross-sectional contour, an inkjet area, etc., of the layer object. The processing device 240 may control the three-dimensional printing equipment 20 according to the above layer information to allow the three-dimensional printing equipment 20 to produce a plurality of the layer objects layer by layer and color the layer objects layer by layer.

In the embodiment, the three-dimensional printing equipment 20 prints the color three-dimensional object 80 using fused deposition modelling (FDM) technology. That is, the print head 210a is disposed to move along an X-Y plane and along a normal direction (a z direction) of the X-Y plane. A forming material F1 enters the print head 210a through the feed pipe to be fused in heat and be extruded out by the print head 210a, so as to build up a plurality of the layer objects (FIG. 3 shows examples of layer objects 80a and 80c) layer by layer on the bearing surface S1 of the aiming platform 250. In this way, the layer objects 80a and 80c that are built up layer by layer are stacked on each other on the bearing surface S1 to form the color three-dimensional object 80. Specifically, the forming material F1 may be formed by a thermal melting material manufactured by methods such as fused filament fabrication (FFF), melted and extrusion modelling, etc., but the disclosure does not intend to impose a limitation on this regard.

In the embodiment, the inkjet head 220a sprays ink I1 onto each of the layer objects 80a and 80c layer by layer, such that the ink I1 overlaps and covers upper surfaces of the layer objects 80a and 80c. Therefore, the inkjet head 220a may include an ink cartridge 220b which is configured to contain the ink I1. The inkjet head 220a is controlled by the processing device 240 to spray the ink I1 which is in the ink cartridge 220b onto the layer objects 80a and 80c to color the layer objects 80a and 80c. Although FIG. 3 illustrates only one ink cartridge 220b, the disclosure is not intended to limit numbers of ink cartridges and ink colors. For instance, the inkjet module 220 may include four ink cartridges for different colors (e.g., yellow (Y), magenta (M), cyan (C), and black (K)) and four corresponding inkjet heads.

With such arrangement, after the print head 210a prints the layer object 80a on the forming platform 250, the inkjet head 220a may spray ink onto the upper surface of the layer object 80a so as to color the layer object 80a. Subsequently, after the print head 210a prints the other layer object 80c on the forming platform 250, the inkjet head 220a may spray ink onto the upper surface of the layer object 80c so as to color the layer object 80c. It is understood that by performing three-dimensional printing operation and inkjet printing operation alternately, the multiple colored layer objects are stacked up sequentially to form a color three-dimensional object.

Note that in the embodiments of the disclosure, the three-dimensional printing equipment 20 may perform inkjet printing operation on a contour edge of each of the layer objects according to an inkjet width. Thus, a surface of the three-dimensional object may display colors. In detail, when the inkjet module 220 colors the layer object, the inkjet module 220 moves on the X-Y plane along the cross-sectional contour of the layer object, so as to spray the ink I1 onto a cross-sectional outer edge of the upper surface of the layer object. By coloring the cross-sectional outer edge of each of the layer objects, an outer surface of the color three-dimensional object that is ultimately formed may display a variety of colors. That is, an inkjet area of each of the layer objects is determined by the cross-sectional contour of the layer object and the inkjet width. The inkjet area may be viewed as a contour linear area determined by the cross-sectional contour, and the inkjet width is a line width of the linear area. To be more specifically, the processing device 240 may produce an inkjet image corresponding to each of the layer objects in advance according to the cross-sectional contour of the layer object and the inkjet width, so as to control the inkjet module 220 to perform inkjet printing in the X-Y plane according to the inkjet images. Particularly, in the embodiments of the disclosure, the inkjet width corresponding to each of the layer objects corresponds may vary according to a surface tilt degree of the three-dimensional object appropriately.

Figure 4:
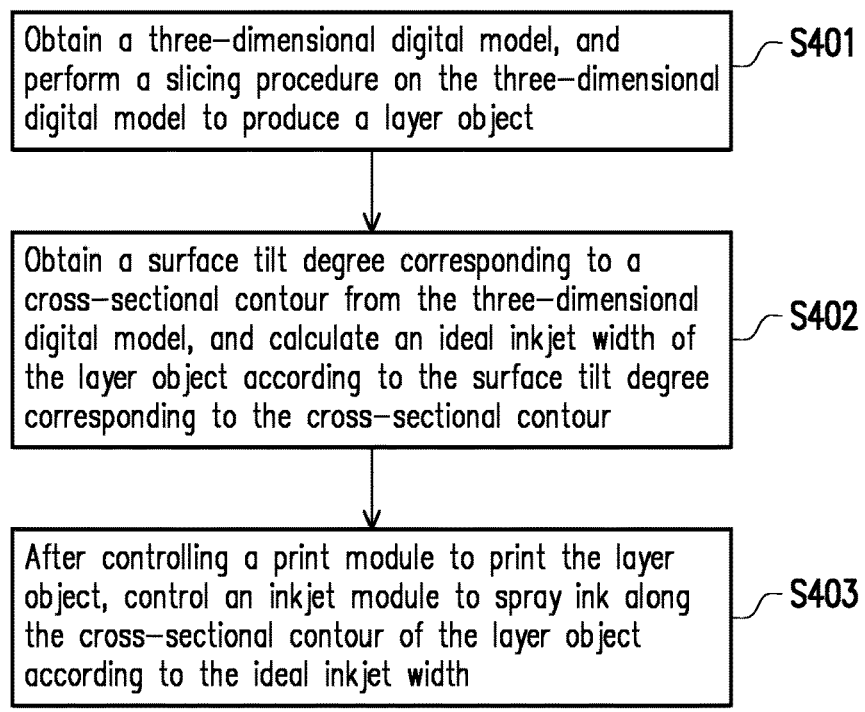
FIG. 4 is a flowchart of an inkjet width adjustment method according to an embodiment of the disclosure.

FIG. 4 is a flowchart of a color three-dimensional printing method according to an embodiment of the disclosure. The method of this embodiment is adapted for the three-dimensional printing equipment 20 of FIGS. 2 and 3. The inkjet width adjustment method of this embodiment is described in detail hereinafter with reference to the components of the three-dimensional printing equipment 20.

In step S401, the processing device 240 obtains a three-dimensional digital model and performs a slicing procedure on the three-dimensional digital model to produce a layer object having a cross-sectional contour. To be specific, the three-dimensional digital model (e.g., a STL file) is to be further compiled and calculated to be converted into relevant information for performing a function of color three-dimensional printing. First, the processing device 240 performs a slicing procedure on the three-dimensional digital model to produce a plurality of layer objects. Generally, the processing device 240 slices the three-dimensional digital model by a plurality of slicing planes which are spaced at equal intervals to extract cross-sectional contours of the layer objects. Thus, a slicing interval for slicing the three-dimensional digital model may be viewed as a layer thickness of the layer object.

Next, in step S402, the processing device 240 obtains a surface tilt degree corresponding to the cross-sectional contour from the three-dimensional digital model and calculates an ideal inkjet width of the layer object according to the surface tilt degree corresponding to the cross-sectional contour. Specifically, after the plurality of layer objects are obtained through the slicing procedure, the processing device 240 may further determine an inkjet area of each of the layer objects. In the embodiment of the disclosure, the processing device 240 may be aware of the surface tilt degree corresponding to the layer object based on the three-dimensional digital model, and then determine the ideal inkjet width (measured in millimeters) of the layer object by the surface tilt degree corresponding to the layer object.

Figure 5:
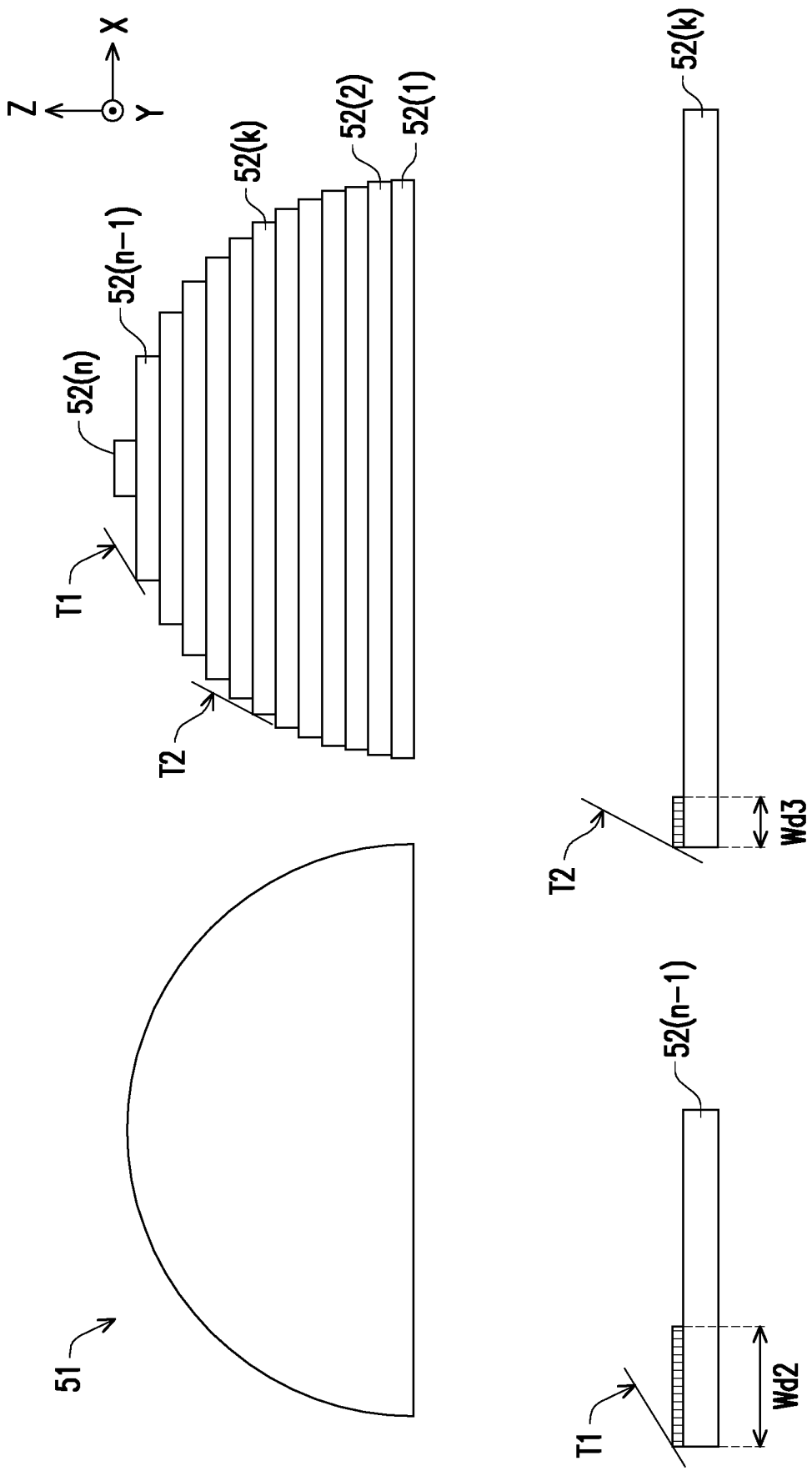
FIG. 5 is a schematic view of determining an ideal inkjet width according to an embodiment of the disclosure.

For example, referring to FIG. 5, FIG. 5 is a schematic view of determining an ideal inkjet width according to an embodiment of the disclosure. It is assumed that the processing device 240 obtains a three-dimensional digital model 51 that is a hemisphere. The processing device 240 may first perform a slicing procedure on the three-dimensional digital model 51 according to the same layer thickness to obtain a plurality of layer objects 52(1), 52(2), . . . 52(k), . . . 52(n−1) and 52 (n), and n is an integer greater than 0, and k is between 1 to n. Then, the processing device 240 may obtain cross-sectional contours of the layer objects 52(1) to 52(n) through the slicing procedure. In the embodiment, since the three-dimensional digital model 51 is a hemisphere, the cross-sectional contours of the layer objects 52(1) to 52(n) are round contours with different radii respectively, and surface tilt degrees corresponding to the cross-sectional contour of the same layer object are identical.

The layer objects 52(k) and 52(n−1) are taken as examples. The processing device 240 may obtain a surface tilt degree T1 corresponding to a cross-sectional contour of the layer object 52(n−1) from the three-dimensional digital model, and then calculate an ideal inkjet width Wd2 according to the surface tilt degree T1 corresponding to the cross-sectional contour of the layer object 52(n−1). Similarly, the processing device 240 may obtain a surface tilt degree T2 corresponding to a cross-sectional contour of the layer object 52(k) from the three-dimensional digital model, and then calculate an ideal inkjet width Wd3 according to the surface tilt degree T2 corresponding to the cross-sectional contour of the layer object 52(k). Due to differences between the surface tilt degree T1 corresponding to the cross-sectional contour of the layer object 52(n−1) and the surface tilt degree T2 corresponding to the cross-sectional contour of the layer object 52(k), the ideal inkjet width Wd2 differs from the ideal inkjet width Wd3. Since the surface tilt degree T2 corresponding to the cross-sectional contour of the layer object 52(k) is steeper than the surface tilt degree T1 corresponding to the cross-sectional contour of the layer object 52(n−1), the ideal inkjet width Wd2 is greater than the ideal inkjet width Wd3. That is, in one embodiment, for each of the layer objects, the ideal inkjet width may be determined individually. Thus, it is avoidable that a outer surface of a color three-dimensional object obviously displays an uncoloured section since overly narrow width ink is sprayed onto the layer object 52(n−1).

Figure 6:
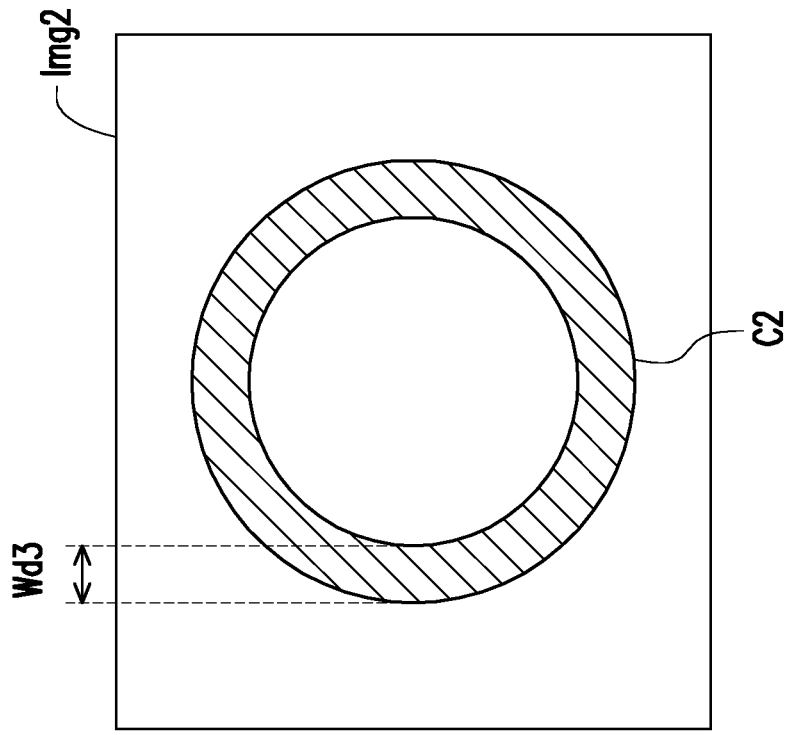
FIG. 6 is a schematic view of an inkjet image according to an embodiment of the disclosure.
Figure 6:
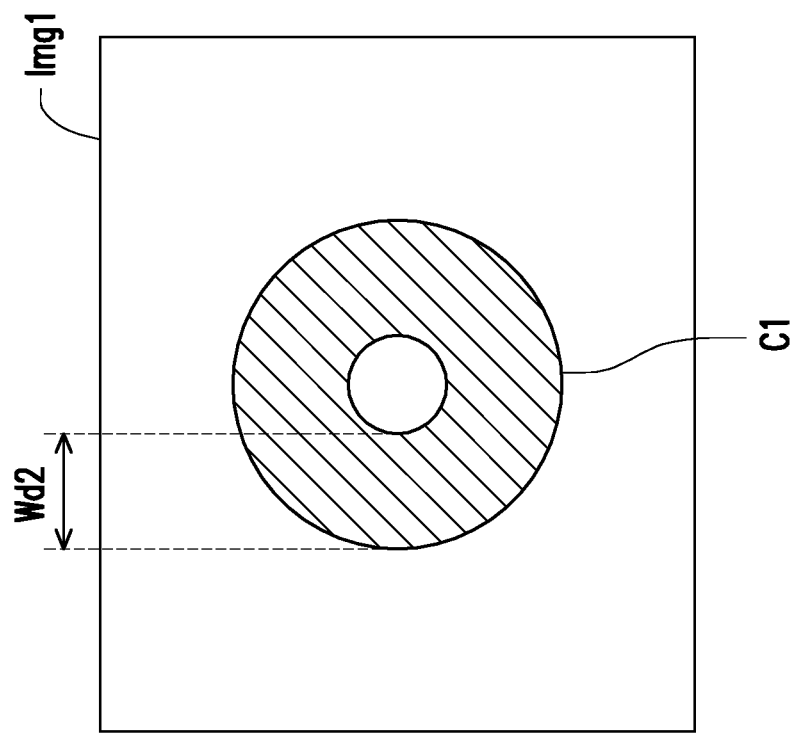

Subsequently, in step S403, after the print module 210 is controlled to print the layer object, the processing device 240 controls the inkjet module 220 to spray ink along the cross-sectional contour of the layer object according to the ideal inkjet width. Specifically, after the processing device 240 determines the ideal inkjet width, the processing device 240 may produce a corresponding inkjet image according to the ideal inkjet width to allow the inkjet module 220 to spray ink onto cross-sectional edges of the layer object according to the inkjet image. For example, the embodiment of FIG. 5 is used for further descriptions. Referring to FIG. 6, FIG. 6 is a schematic view of an inkjet image according to an embodiment of the disclosure. After the processing device 240 calculates the ideal inkjet width Wd2, the processing device 240 may produce an inkjet image Img1 according to a cross-sectional contour C1 of the layer object 52(n−1) and the ideal inkjet width Wd2. After the processing device 240 calculates the ideal inkjet width Wd3, the processing device 240 may produce an inkjet image Img2 according to a cross-sectional contour C2 of the layer object 52(k) and the ideal inkjet width Wd3. In this way, the inkjet module 220 may spray the ink I1 onto edges of the layer object 52(k) according to a pixel position and a color feature value recorded by the inkjet image Img2. Moreover, the inkjet module 220 may spray the ink I1 onto edges of the layer object 52(n−1) according to a pixel position and a color feature value recorded by the inkjet image Img1.

Several exemplary embodiments are provided hereafter to illustrate how to obtain the surface tilt degree of the cross-sectional contour. In one embodiment, a three-dimensional digital model is formed by a plurality of polygon meshes. Moreover, each of the polygon meshes has a plurality of vertexes having different coordinates respectively. For instance, the polygon meshes may generally be triangular meshes, and each of the polygon mesh may be regarded as a triangular facet formed by three vertexes. When the slicing procedure is performed, one slicing surface configured for performing the slicing procedure passes through some of the polygon meshes of the three-dimensional digital model so as to extract the cross-sectional contour of the layer object. Then, in one embodiment, the processing device 240 may obtain the at least one polygon mesh corresponding to the cross-sectional contour from the three-dimensional digital model. Subsequently, the processing device 240 may calculate at least one included angle between the at least one polygon mesh and a horizontal plane that represents the surface tilt degree corresponding to the cross-sectional contour. Specifically, the processing device 240 may calculate the included angle between the polygon mesh and the horizontal plane according to the coordinates of the vertexes of the polygon mesh.

Figure 7A:
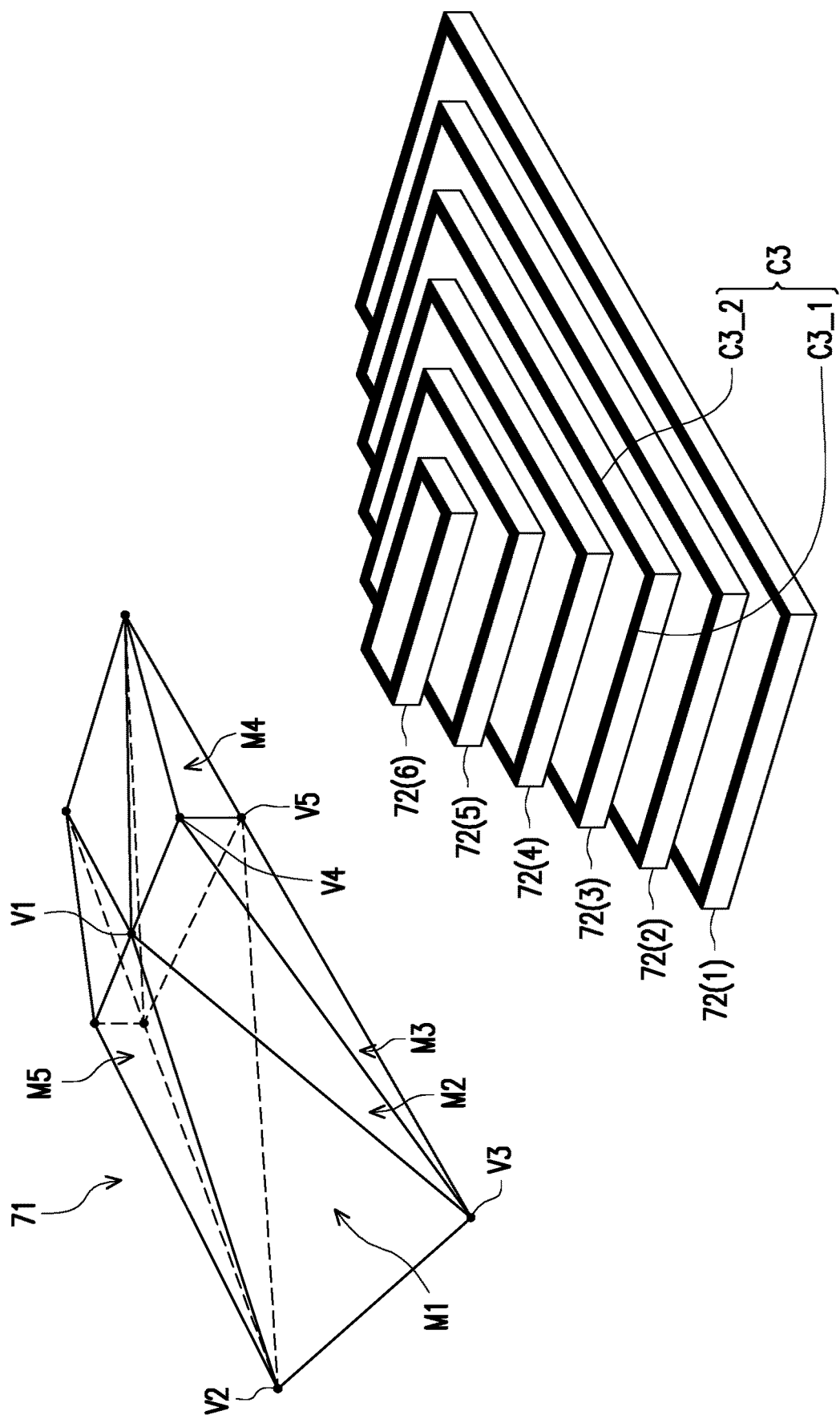
FIG. 7A is a schematic view of a three-dimensional digital model and a layer object according to an embodiment of the disclosure.

Referring to FIG. 7A, FIG. 7A is a schematic view of a three-dimensional digital model and a layer object according to an embodiment of the disclosure. In the exemplary embodiment of the disclosure, it is assumed that the processing device 240 performs the slicing procedure on a three-dimensional digital model 71 that is formed by 12 triangular meshes such as triangular meshes M1, M2, M3, etc. Here, the triangular mesh M1 has three vertexes V1, V2 and V3. The triangular mesh M2 has three vertexes V1, V3 and V4. The triangular mesh M3 has three vertexes V4, V3 and V5. It is further assumed that after the processing device 240 performs the slicing procedure on the three-dimensional digital model 71 according to a layer thickness, six layer objects 72(1) to 72(6) may be produced. Cross-sectional contours of the layer objects 72(1) to 72(6) are in the shape of a rectangle and come in different sizes. Taking the layer object 72(3) for example, the processing device 240 may obtain a plurality of triangular meshes (e.g., the triangular meshes M1, M2, M3, M4, etc., in the embodiment) corresponding to the layer object 72(3) according to the cross-sectional contour of the layer object 72(3).

Figure 7B:
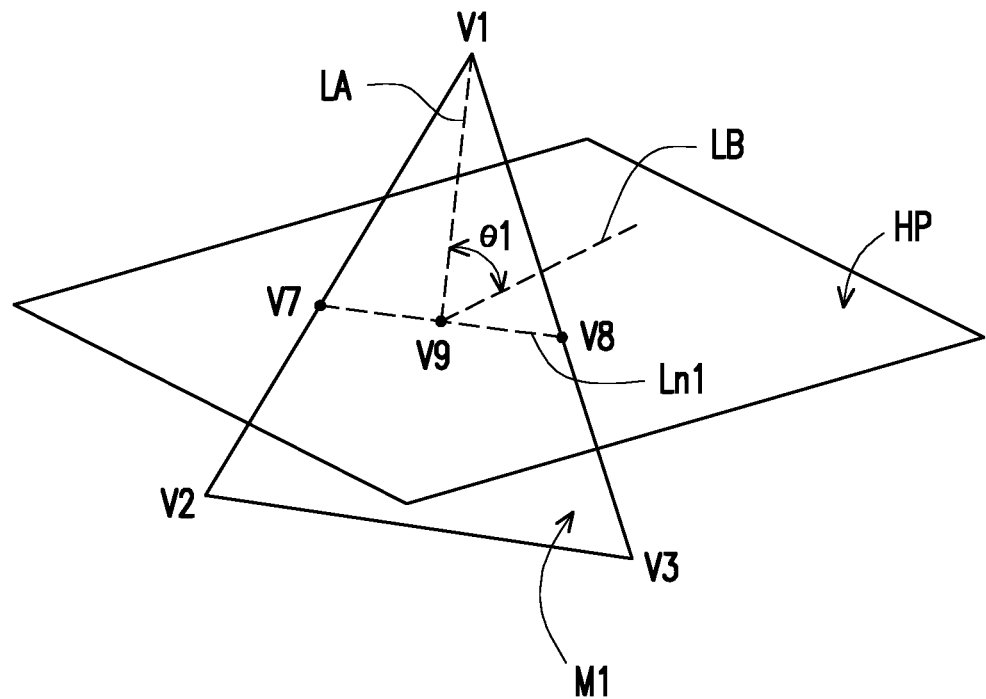
FIG. 7B is a schematic view of calculating an included angle between a polygon mesh and a horizontal plane according to an embodiment of the disclosure.

Next, referring to FIG. 7B, FIG. 7B is a schematic view of an included angle between a polygon mesh and a horizontal plane according to an embodiment of the disclosure. Taking the triangular mesh M1 for example, the processing device 240 may calculate an included angle θ1 between the triangle mesh M1 and a horizontal plane HP. Thus, the included angle θ1 representing a surface tilt degree of the cross-sectional contour C3 is obtained. For example, when the slicing processing is performed using the horizontal plane HP, the horizontal plane HP intersects the triangle mesh M1 at intersection points V7 and V8, and a straight line Ln1 between the intersection points V7 and V8 may constitute a portion of the cross-sectional contour C3. The included angle θ1 between the triangle mesh M1 and the horizontal plane HP is an included angle between a triangular plane which are determined by the vertex V1 and the intersection points V7 and V8 and the horizontal plane HP. The included angle θ1 between the triangle mesh M1 and the horizontal plane HP may be obtained by the method below. A perpendicular line LA that passes through the vertex V1 and is perpendicular to the straight line Ln1 (a connection line between the intersection points V7 and V8) is obtained and intersects the straight line Ln1 at a pedal point V9. Next, another perpendicular line LB that passes through the pedal point V9, is perpendicular to the straight line Ln1, and is located on the horizontal plane HP is obtained. Thus, the included angle θ1 may be obtained by calculating the included angle between the perpendicular line LA and the perpendicular line LB. Note that the processing device 240 also calculates another included angle between the another triangle mesh M2 and the horizontal plane HP. Thus, another included angle representing the surface tilt degree corresponding to the cross-sectional contour C3 is obtained. Under this situation, when an included angle between the triangular plane determined by a top point V3 and two intersection points (i.e. the two intersection points of the horizontal plane HP and the triangular mesh M2) and the horizontal plane HP is calculated, an included angle between the triangular mesh M2 that is in the shape of an inverted triangle and the horizontal plane HP may exceed 90 degrees. Similarly, the processing device 240 also calculates an included angle between the another triangular mesh M3 and the horizontal plane HP. Thus, another included angle representing the surface tilt degree corresponding to the cross-sectional contour C3 is obtained. In other words, the same layer object may correspond to multiple different included angles. That is, for the same layer object, since the three-dimensional digital model is in an irregular shape, the cross-sectional contour of the layer object may correspond to multiple different surface tilt degrees.

As described above, when the slicing procedure is performed using the horizontal plane HP, the horizontal plane HP intersects the triangle mesh M1 at the intersection points V7 and V8. The straight line Ln1 between the intersection points V7 and V8 is a segmental portion of the cross-sectional contour C3. Accordingly, the processing device 240 may calculate the ideal inkjet width for the segmental portion of the cross-sectional contour C3 corresponding to the triangular mesh M1. Thus, an inkjet area where a width is equal to the ideal inkjet width and a length is equal to a length of the straight line Ln1 is obtained. Similarly, when the slicing procedure is performed using the horizontal plane HP, the horizontal plane HP intersects the triangular mesh M2 at the intersection point V8 and another intersection point (not shown), and another straight line between the intersection point V8 and the another intersection point forms another segmental portion of the cross-sectional contour C3. Thus, the processing device 240 may not only calculate the ideal inkjet width for the straight line Ln1 corresponding to the triangular mesh M1, but also calculate another ideal inkjet width for another straight line (between the intersection point V8 and the another intersection point) corresponding to the triangular mesh M2. The length of the straight line Ln1 corresponding to the triangular mesh M1 may be the same as or different from a length of the another straight line corresponding to the triangular mesh M2. Next, since the processing device 240 may calculate the another ideal inkjet width for the segmental portion of the cross-sectional contour C3 corresponding to the triangular mesh M2, the processing device 240 may obtain an inkjet area where a width is equal to the another ideal inkjet width and a length is equal to the length of the another straight line.

That is, since the same slicing plane may pass through multiple different triangular meshes, the processing device 240 may calculate multiple ideal inkjet widths corresponding to different contour sections of the cross-sectional contour. In addition, since different contour sections of the cross-sectional contour of a single layer object may have identical or different contour lengths, inkjet areas corresponding to the different contour sections may have different or identical lengths.

However, FIGS. 7A and 7B only provide exemplary illustrations and are not intended to limit the disclosure. With reference to the illustrations in FIGS. 7A and 7B, persons of ordinary skill in the art may obtain sufficient teachings and recommendations to infer how to calculate the surface tilt degree corresponding to the layer object for the three-dimensional digital model in other shapes.

In one embodiment, after at least one included angle representing the surface tilt degree is obtained, the processing device 240 may calculate the ideal inkjet width of the layer object according to the at least one included angle between the polygon mesh and the horizontal plane, the layer thickness and a predetermined inkjet width. In one embodiment, the processing device 240 may calculate the ideal inkjet width of the layer object based on Formula (1) below.

$$Wd_{ideal}=\text{Max}(h^*|\cot\theta|, Wdp) \quad \text{Formula(1)}$$

wherein, $Wd_{ideal}$ represents the ideal inkjet width, h represents the layer thickness, θ represents the included angle between the polygon mesh and the horizontal plane (e.g., the included angle θ1 in FIG. 7B), and Wdp represents the predetermined the inkjet width. It is understood that θ is between 0 degree to 180 degrees. Referring to Formula (1), the processing device 240 calculates a product of a cotangent value of the at least one included angle and the layer thickness, and a maximum value between the product and the predetermined inkjet width is taken as the ideal inkjet width. The predetermined inkjet width is a predetermined minimum inkjet width and may be devised depending on actual needs. Note that when the included angle between the polygon mesh and the horizontal plane is greater than 90 degrees, cote is negative. Accordingly, an absolute value of cote is chosen in Formula (1).

Figure 8:
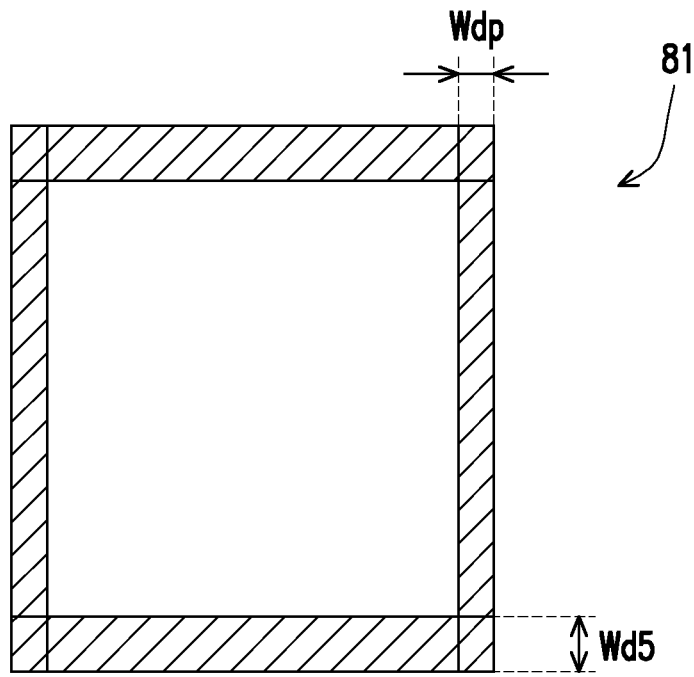
FIG. 8 illustrates an embodiment of an inkjet area of a layer object 72(3) according to the embodiment of FIG. 7A.

The layer object 72(3) in FIG. 7A is taken as an example for further descriptions. Referring to FIG. 8, FIG. 8 illustrates an embodiment of the inkjet area of the layer object 72(3) according to the embodiment of FIG. 7A. Assuming that the triangular meshes M3 and M4 are perpendicular to a horizontal plane, an ideal inkjet width of a section C3_2 of the cross-sectional contour C3 is equal to the predetermined inkjet width Wdp according to Formula (1). Assuming that the triangular meshes M1, M2 and M5 are coplanar, an ideal inkjet width of a section C3_1 of the cross-sectional contour C3 is equal to Wd5=h*cot θ, and θ is equal to θ1 in FIG. 7B.

It can be understood based on the above that for the three-dimensional digital model in an irregular shape, the same layer object may correspond to different surface tilt degrees. Accordingly, the polygon mesh corresponding to the layer object 72(3) may include the triangular mesh M1 (i.e. a first polygon mesh) and the polygon mesh M3 (i.e. a second polygon mesh). In one embodiment, the processing device 240 may calculate a first included angle between the triangular mesh M1 and the horizontal plane and calculate a second included angle between the triangular mesh M3 and the horizontal plane. Next, the processing device 240 calculates a first ideal inkjet width (e.g. Wd5 shown in an inkjet area 81 of FIG. 8) of the ideal inkjet width according to the first included angle, the layer thickness and the predetermined inkjet width and calculates a second ideal inkjet width (e.g., Wdp shown in the inkjet area 81 of FIG. 8) of the ideal inkjet width according to the second included angle, the layer thickness and the predetermined inkjet width. In other words, the same layer object is likely to have multiple different ideal inkjet widths. In general, for two three-dimensional digital models with similar volumes, a model which is more complicated or irregular has more polygon meshes of smaller areas than another model and therefore may correspond to more different ideal inkjet widths.

Note that calculation presented by Formula (1) is only an implementation of the disclosure. In other embodiments, the processing device 240, for example, may look up a table through a pre-predetermined lookup table based on the included angle representing the surface tilt degree to obtain the corresponding ideal inkjet width. In the embodiment of the disclosure, the ideal inkjet width increases with a decrease in the included angle, and decreases with an increase in the included angle. For instance, if the included angle representing the surface tilt degree is within a first predetermined range, the processing device may directly obtain an ideal inkjet width corresponding to the first predetermined range according to the lookup table. If the included angle representing the surface tilt degree is within a second predetermined range, the processing device may directly obtain an ideal inkjet width corresponding to the second predetermined range according to the lookup table. Here, the first predetermined range is different from the second predetermined range.

Figure 9:
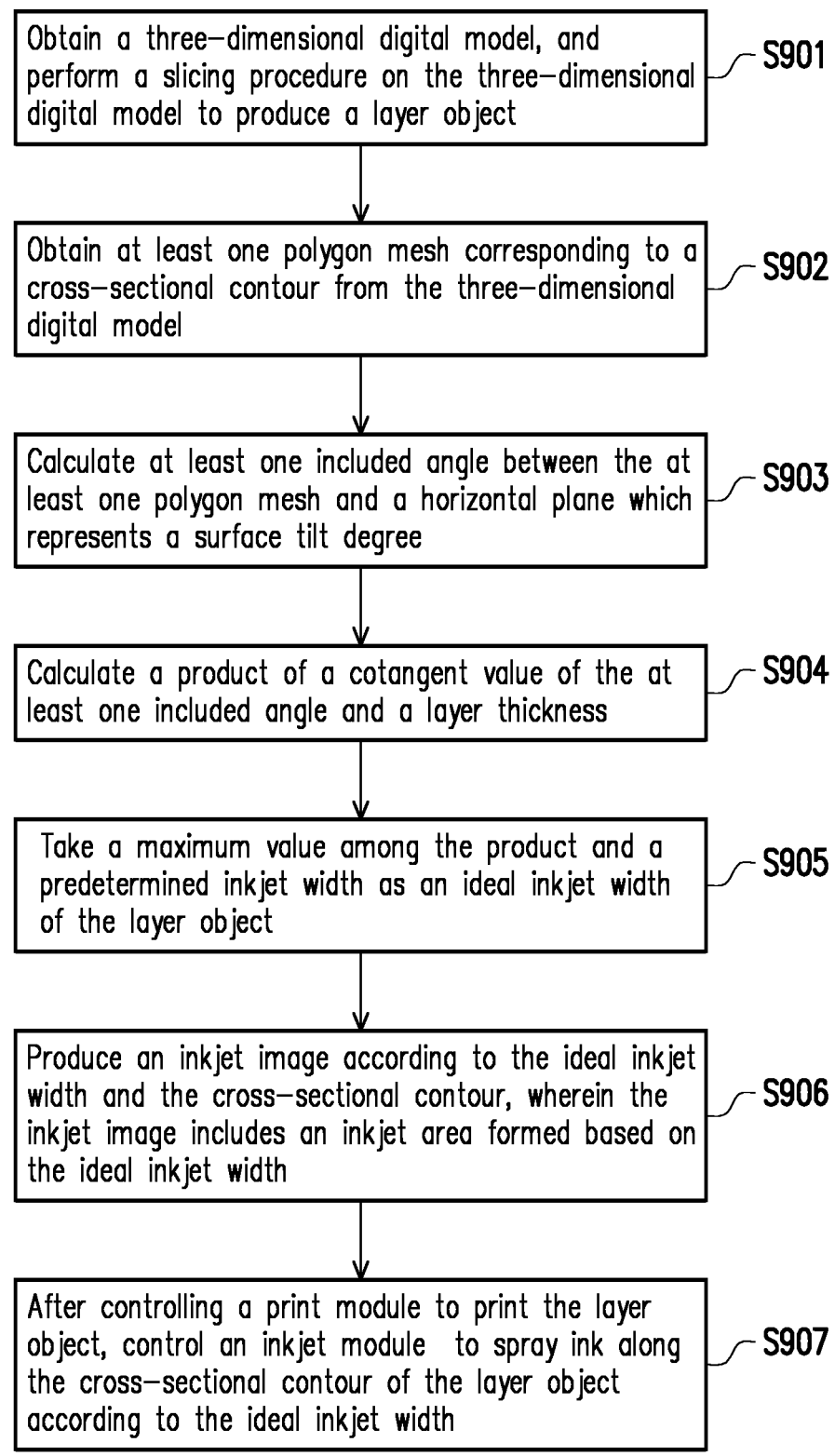
FIG. 9 is a flowchart of an inkjet width adjustment method according to an embodiment of the disclosure.

FIG. 9 is a flowchart of an inkjet width adjustment method according to an embodiment of the disclosure, and the specifics of implementation may be shown in the embodiments of FIG. 2 to FIG. 8. Referring to FIG. 9, in step S901, a three-dimensional digital model is obtained, and a slicing procedure is performed on the three-dimensional digital model to produce a layer object. In step S902, at least one polygon mesh corresponding to the cross-sectional contour is obtained from the three-dimensional digital model. In step S903, at least one included angle between at least one polygon mesh and a horizontal plane for representing a surface tilt degree is calculated. In step S904, a product of a cotangent value of the at least one included angle and a layer thickness is calculated. In step S905, a maximum value among the product and a predetermined inkjet width is taken as an ideal inkjet width of the layer object. In step S906, an inkjet image is produced according to the ideal inkjet width and a cross-sectional contour and includes an inkjet area formed according to the ideal inkjet width. In step S907, after a print module is controlled to print the layer object, an inkjet module is controlled to spray ink along the cross-sectional contour of the layer object according to the ideal inkjet width.

Figure 10:
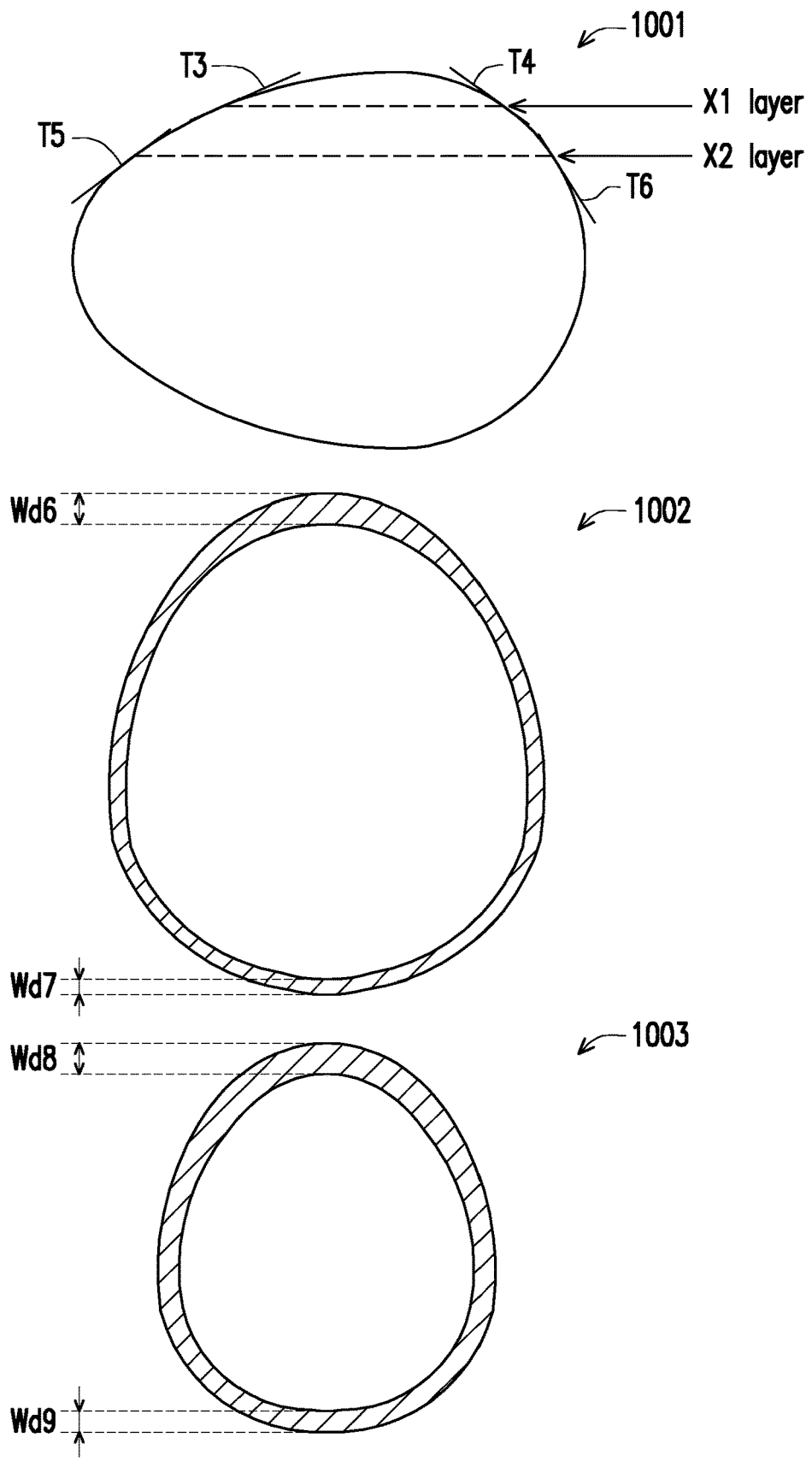
FIG. 10 is an exemplary schematic view of obtaining an ideal inkjet width according to an embodiment of the disclosure.

FIG. 10 is an exemplary schematic view of obtaining an ideal inkjet width according to an embodiment of the disclosure. Referring to FIG. 10, it is assumed that a three-dimensional digital model 1001 is a three-dimensional egg-shaped model that is disposed horizontally. A cross-sectional contour of a layer object in an X1 layer corresponds to different surface tilt degrees (e.g., surface tilt degrees T3 and T4). Accordingly, through calculating the ideal inkjet widths of the layer object in the X1 layer based on the surface tilt degree, an inkjet area 1003 of the layer object in the X1 layer may be as shown in FIG. 10 based on the cross-sectional contour of the layer object in the X1 layer and the surface tilt degree corresponding thereto. It can be seen based on the inkjet area 1003 that since the surface tilt degree T4 is steeper than the surface tilt degree T3 (that is, the surface tilt degree T3 is more smooth than the surface tilt degree T4), an ideal inkjet width Wd6 corresponding to the surface tilt surface T3 is greater than an ideal inkjet width Wd7 corresponding to the surface tilt surface T4. On the other hand, a cross-sectional contour of a layer object in an X2 layer also corresponds to different surface tilt degrees (e.g., surface tilt degrees T5 and T6). Based on the cross-sectional contour of the layer object in the X2 layer and the surface tilt degree corresponding thereto, an inkjet area 1002 of the layer object in the X2 layer may be as shown in FIG. 10. It can be seen based on the inkjet area 1002 that since the surface tilt degree T5 is more smooth than the surface tilt degree T6, an ideal inkjet width Wd8 corresponding to the surface tilt degree T5 is greater than an ideal inkjet width Wd9 corresponding to the surface tilt degree T6. In this way, the inkjet module of the three-dimensional digital model performs inkjet printing on cross-sectional edges of the layer objects in the X1 and X2 layers according to the inkjet areas 1002 and 1003 to color outer surfaces of the layer objects in the X1 and X2 layers.

In view of the foregoing, for the inkjet width adjustment method and the three-dimensional digital model according to the embodiments of the disclosure, the ideal inkjet width may be adjusted appropriately according to the surface tilt degree corresponding to the layer object on the three-dimensional object. Then, after the print head prints the layer object, the three-dimensional printing equipment may control the inkjet module to spray ink along the cross-sectional contour of the layer object according to the ideal inkjet width. In this way, although the surface tilt degree of the three-dimensional object is rather smooth, or a gap between edges of the vertically adjacent layer objects is overly large, exposed portions of a surface of the three-dimensional object may all be colored accurately, and the printing quality of color three-dimensional printing improves significantly. Therefore, the three-dimensional printing equipment according to the disclosure may perform inkjet printing on the three-dimensional object according to the inkjet area with higher accuracy to prevent a surface of the three-dimensional object that is completed from displaying uncoloured sections.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An inkjet width adjustment method adapted for printing a color three-dimensional object, comprising:
obtaining a three-dimensional digital model, and performing a slicing procedure on the three-dimensional digital model to produce a layer object, wherein the layer object has a cross-sectional contour;
obtaining a surface tilt degree corresponding to the cross-sectional contour from the three-dimensional digital model, and calculating an adjusted inkjet width of the layer object according to the surface tilt degree corresponding to the cross-sectional contour;
controlling a printing module to print the layer object; and
after the printing module is controlled to print the layer object, controlling an inkjet module to spray ink along the cross-sectional contour of the layer object according to the adjusted inkjet width,
wherein the step of obtaining the surface tilt degree corresponding to the cross-sectional contour from the three-dimensional digital model, and calculating the adjusted inkjet width of the layer object according to the surface tilt degree corresponding to the cross-sectional contour comprises:
obtaining at least one polygon mesh corresponding to the cross-sectional contour from the three-dimensional digital model;
calculating at least one included angle between the at least one polygon mesh and a horizontal plane for representing the surface tilt degree; and
calculating the adjusted inkjet width of the layer object according to the at least one included angle, a layer thickness and a predetermined inkjet width.

2. The inkjet width adjustment method according to claim 1, wherein calculating the adjusted inkjet width of the layer object according to the at least one included angle, the layer thickness and the predetermined inkjet width comprises:
calculating a product of a cotangent value of the at least one included angle and the layer thickness; and
taking a maximum value between the product and the predetermined inkjet width as the adjusted inkjet width of the layer object.

3. The inkjet width adjustment method according to claim 1, wherein the at least one polygon mesh comprises a first polygon mesh and a second polygon mesh, and calculating the at least one included angle between the at least one polygon mesh and the horizontal plane comprises:
calculating a first included angle between the first polygon mesh and the horizontal plane, and calculating a second included angle between the second polygon mesh and horizontal plane.

4. The inkjet width adjustment method according to claim 3, wherein calculating the adjusted inkjet width according to the at least one included angle, the layer thickness and the predetermined inkjet width comprises:
calculating a first adjusted inkjet width of the adjusted inkjet width according to the first included angle, the layer thickness and the predetermined inkjet width; and
calculating a second adjusted inkjet width of the adjusted inkjet width according to the second included angle, the layer thickness and the predetermined inkjet width.

5. The inkjet width adjustment method according to claim 1, further comprising:
producing an inkjet image according to the adjusted inkjet width and the cross-sectional contour, wherein the inkjet image comprises an inkjet area formed based on the adjusted inkjet width.

6. Three-dimensional printing equipment adapted to print a color three-dimensional object, comprising:
a printing module, comprising a printing head;
an inkjet module, comprising an inkjet head;
a storage device, recording a plurality of modules; and
a processing device, coupled to the storage device and configured to execute the modules to:
obtain a three-dimensional digital model, and perform a slicing procedure on the three-dimensional digital model to produce a layer object, wherein the layer object has a cross-sectional contour;
obtain a surface tilt degree corresponding to the cross-sectional contour from the three-dimensional digital model, and calculate an adjusted inkjet width according to the surface tilt degree corresponding to the cross-sectional contour;
control the printing module to print the layer object; and
after the printing module is controlled to print the layer object, control the inkjet module to spray ink along the cross-sectional contour of the layer object according to the adjusted inkjet width,
wherein the processing device is configured to: obtain at least one polygon mesh corresponding to the cross-sectional contour from the three-dimensional digital model; calculate at least one included angle between the at least one polygon mesh and a horizontal plane for representing the surface tilt degree; and calculate the adjusted inkjet width of the layer object according to the at least one included angle, a layer thickness and a predetermined inkjet width.

7. The three-dimensional printing equipment according to claim 6, wherein the processing device is configured to: calculate a product of a cotangent value of the at least one included angle and the layer thickness; and take a maximum value between the product and the predetermined inkjet width as the adjusted inkjet width of the layer object.

8. The three-dimensional printing equipment according to claim 6, wherein the at least one polygon mesh comprises a first polygon mesh and a second polygon mesh, and the processing device is configured to: calculate a first included angle between the first polygon mesh and the horizontal plane; and calculate a second included angle between the second polygon mesh and the horizontal plane.

9. The three-dimensional printing equipment according to claim 8, wherein the processing device is configured to: calculate a first adjusted inkjet width of the adjusted inkjet width according to the first included angle, the layer thickness and the predetermined inkjet width; and calculate a second adjusted inkjet width of the adjusted inkjet width according to the second included angle, the layer thickness and the predetermined inkjet width.

10. The three-dimensional printing equipment according to claim 6, wherein the processing device is configured to: produce an inkjet image according to the adjusted inkjet width and the cross-sectional contour, wherein the inkjet image includes an inkjet area formed based on the adjusted inkjet width.

* * * * *